United States Patent [19]
Fletcher et al.

[11] Patent Number: 4,555,455
[45] Date of Patent: Nov. 26, 1985

[54] AMBIENT TEMPERATURE THERMAL BATTERY

[75] Inventors: Aaron N. Fletcher; George E. McManis, III; Dan E. Bliss, all of Ridgecrest, Calif.

[73] Assignee: The United States of America as represented by the Secretary of the Navy, Washington, D.C.

[21] Appl. No.: 701,724

[22] Filed: Feb. 14, 1985

[51] Int. Cl.⁴ .................................... H01M 6/36
[52] U.S. Cl. .................... 429/112; 429/188; 429/201; 429/218
[58] Field of Search ............... 429/103, 112, 188, 189, 429/201, 218, 206, 207

[56] References Cited

U.S. PATENT DOCUMENTS

| 3,472,745 | 10/1969 | Heredy | 204/68 |
| 3,726,718 | 4/1973 | Mellors | 429/112 |
| 3,819,415 | 6/1974 | Benderly et al. | 429/112 |
| 3,904,435 | 9/1975 | Benderly | 429/112 |
| 4,260,667 | 4/1981 | Miles et al. | 429/112 |
| 4,287,059 | 9/1981 | Coetzer et al. | 429/103 |
| 4,287,271 | 9/1981 | Coetzer et al. | 429/103 |
| 4,315,059 | 2/1982 | Raistrick et al. | 429/112 |
| 4,416,958 | 11/1983 | Miles et al. | 429/103 |

OTHER PUBLICATIONS

Wallace et al., Fused Organic Electrolytes for Thermal Cells, Journal Electrochem. Soc., Electrochemical Science, vol. 114, No. 3, pp. 209–211, 3/1967.
Wallace et al., Fused-Acetamide Thermal Cells, J. Electrochemical Soc. Electrochemical Science, vol. 114, No. 3, pp. 212–215, Mar. 1967.

Primary Examiner—Anthony Skapars
Attorney, Agent, or Firm—Robert F. Beers; W. Thom Skeer; Shelley G. Precivale

[57] ABSTRACT

An ambient temperature thermal battery having two relatively high temperature melting electrolytes which form a low melting temperature electrolyte upon activation.

19 Claims, 6 Drawing Figures

AMBIENT TEMPERATURE THERMAL BATTERY

BACKGROUND OF THE INVENTION

1. Field of the Invention

This invention relates to thermal batteries. More particularly, this invention relates to thermal batteries which are operable at ambient temperatures after initial activation. Still more particularly, but without limitation thereto, this invention relates to thermal batteries which have a long shelf life at storage temperatures up to 70° C. and which can be reused for several months after activation.

2. Description of the Prior Art

Most of the presently used thermal batteries employ a LiCl-KCl mixture as the electrolyte and use calcium chromate as the cathodic material. This electrolyte has a relatively high melting point for activation, 352° C.

Nitrate salt mixtures such as $LiNO_3$-$KNO_3$, have lower melting points of around 130° C., and have been used as an electrolyte. Another low melting point system includes $AlCl_3$ and alkylpyridinium chlorides as ionic liquids.

Finally, it has been known that amide nitrate systems will melt around 0° C. but no use as electrolytes has previously been described.

SUMMARY OF THE INVENTION

An object of the present invention is to provide a thermal battery which will operate at ambient temperatures after initial activation.

A further object is to provide a power source with a 10 to 20 year shelf life when stored up to 70° C. and which can be reused for several months after activation.

These and other objects have been demonstrated by the present invention wherein an ambient temperature thermal battery comprises a low temperature melting electrolyte formd by mixing two relatively high temperature melting (>80° C.) electrolytes.

DESCRIPTION OF THE PREFERRED EMBODIMENT

Figure 1:
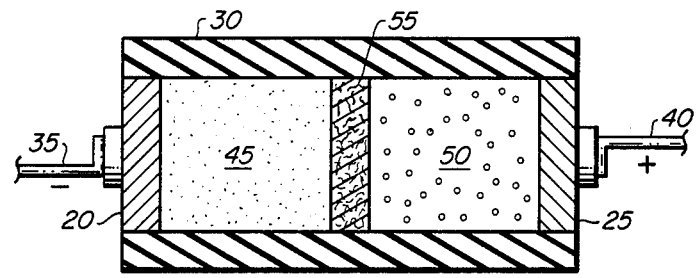
FIG. 1 is a general representation of the battery cell having a partition between the electrolytes.

The thermal battery of the present invention is an ambient temperature system. It contains two relatively high temperature melting electroyltes, preferably melting above 80° C. Upon activation, these electrolytes fuse together, mixing to form a low temperature melting electrolyte which remains a liquid at ambient temperature, thereby allowing for continuous operation as such temperature. The battery cell is activated by conventional means such as heat paper or resistance heating using an external power source.

The present invention encompasses a thermal battery (FIGS. 1, 2 and 3) having an anode 20, an anode lead 35, a cathode 25 and a cathode lead 40, all of which are encased within a cell wall 30.

Figure 2:
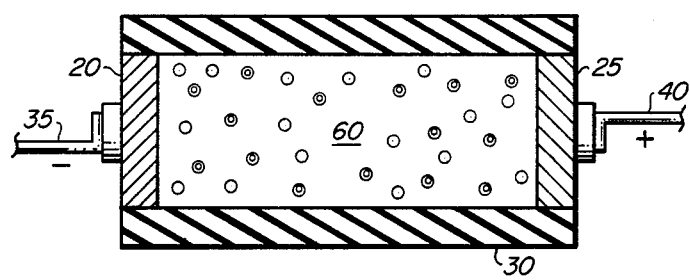
FIG. 2 is another embodiment of the battery cell where the electrolyte particles are encapsulated.
Figure 3:
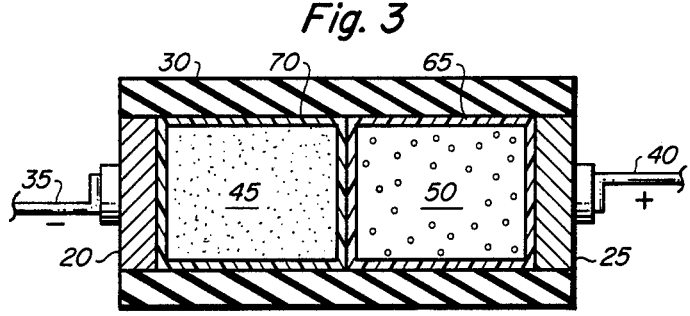
FIG. 3 is another embodiment of the battery cell where the electrolytes are coated.

FIG. 1 allows for a partition 55 to separate the first 45 and second 50 electrolytes. FIG. 2 presents another embodiment wherein the electrolytes form a mix 60, where the particles are encapsulated to prevent interaction of the electrolyte particles. FIG. 3 illustrates another means for separating the electrolytes: the first 45 and second 50 electrolytes have individual coatings 70 and 65 respectively.

The anode 20 is preferably made of calcium or lithium. Other suitable materials are: aluminum amalgam, zinc amalgam, zinc, magnesium, lithium-aluminum alloys and lithium-silicon alloys.

The cathode 25 is constructed of one of the following materials: $CuCl_2$, $CuS$, $CuCrO_4$, $Ag_2S$, $Ag_2CrO_4$, $AgCl$, $AgF$, $AgBr$, $AgI$, $FeS_2$, $TiS_2$, $Ag_2MoO_4$, $Ag_2WO_4$, $Ag_2O$, $AgIO_3$, $AgIO_4$ and $(NH_4)_2Ce(NO_3)_6$. Depending upon the particular needs of the system, certain cathodic materials may be preferred. If a high voltage is being sought, the preferred material is $(NH_4)_2Ce(NO_3)_6$. On the other hand, for a high current the preferred materials are $Ag_2CrO_4$, $Ag_2MoO_4$, $Ag_2WO_4$, $Ag_2O$ and $AgIO_4$.

Several designs may be utilized in the battery cell to keep the two relatively high melting temperature electrolytes apart, prior to melting which yields the low melting temperature electrolyte mixture.

FIG. 1 illustrates the use of a partition 55 as a means for separating the electrolytes. This partition may be a powdered spacer made of a compound such as fumed silica (Cab-O-Sil); a woven fiber such as fiber glass, cellulose, yttrium oxide or other woven ceramic materials. Upon activation, the melting electrolytes diffuse through the partition and form the low melting temperature mixture. The partition 55 can also be a meltable wax or plastic layer, which melts upon activation thereby allowing the electrolytes to mix.

FIGS. 2 and 3 show alternative means for separating the electrolytes. The individual electrolyte particles can be encapsulated with any nonpermeable substance such as wax or stearic acid, as is shown in FIG. 2, to form a mix 60. Another method entails coating each electrolyte individually with a layer of material such as wax or stearic acid, as in FIG. 3. This coating is on the order of 0.5 mm or less in thickness and covers each electrolyte in its entirety. Upon activation, the encapsulating or coating material melts so as to allow mixing of the electrolytes.

The electrolytes used in this invention are amides, inorganic nitrate salts and mixtures thereof. Table 1 illustrates the possible combinations where A is one or more amides, N is one or more inorganic nitrate salts and A/N is a mixture of one or more amides with one or more inorganic nitrate salts.

TABLE 1

| First Electrolyte | Second Electrolyte |
| --- | --- |
| A | N |
| N | A |
| A/N | A/N |
| A | A/N |
| A/N | A |
| N | A/N |
| A/N | N |

Unsubstituted amides such as acetamide, urea and butyramide are preferred. Monosubstituted amides such as N,N'-dimethyl urea, N-methylacetamide and diacetamide are also suitable. Several inorganic nitrate salts can be used: lithium nitrate, sodium nitrate and ammonium nitrate.

In order to achieve rapid activation of the battery cell, it is preferable to have a minimum of 2 to 3 mole percent of the electrically conducting nitrate salt in both the first and second electrolytes. Additionally, the melting points of the electrolytes should be within the range of 60° to 120° C.

When the first and second electrolytes are comprised of an all nitrate salt, the time for complete melting and mixing of the two is on the order of hours at 125°0 C. The more preferred situation is where the nitrate salts are mixed in sufficient portions to both lower the melting points of the two different amides and to also supply immediate electrical conduction. In this manner, electrical voltage is observed in about 10 seconds.

EXAMPLE

A test cell is prepared having a silver chromate ($Ag_2CrO_4$) cathode and a calcium anode. No partition is used and the electrolyte is premixed and prefused so as to have the following composition by mole percent: 20% ammonium nitrate, 32% urea and 48% acetamide.

Figure 4:
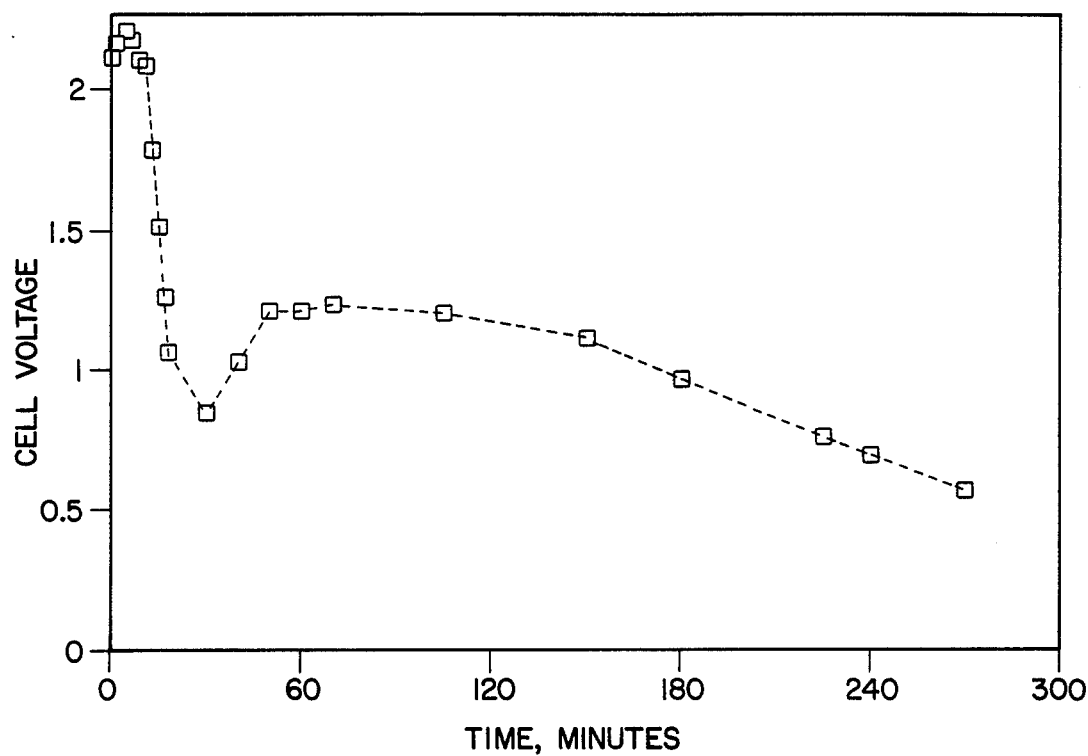
FIG. 4 is a graph illustrating the voltage output of a test cell operating at a current density of $0.5$ $mAcm^{-2}$.
Figure 5:
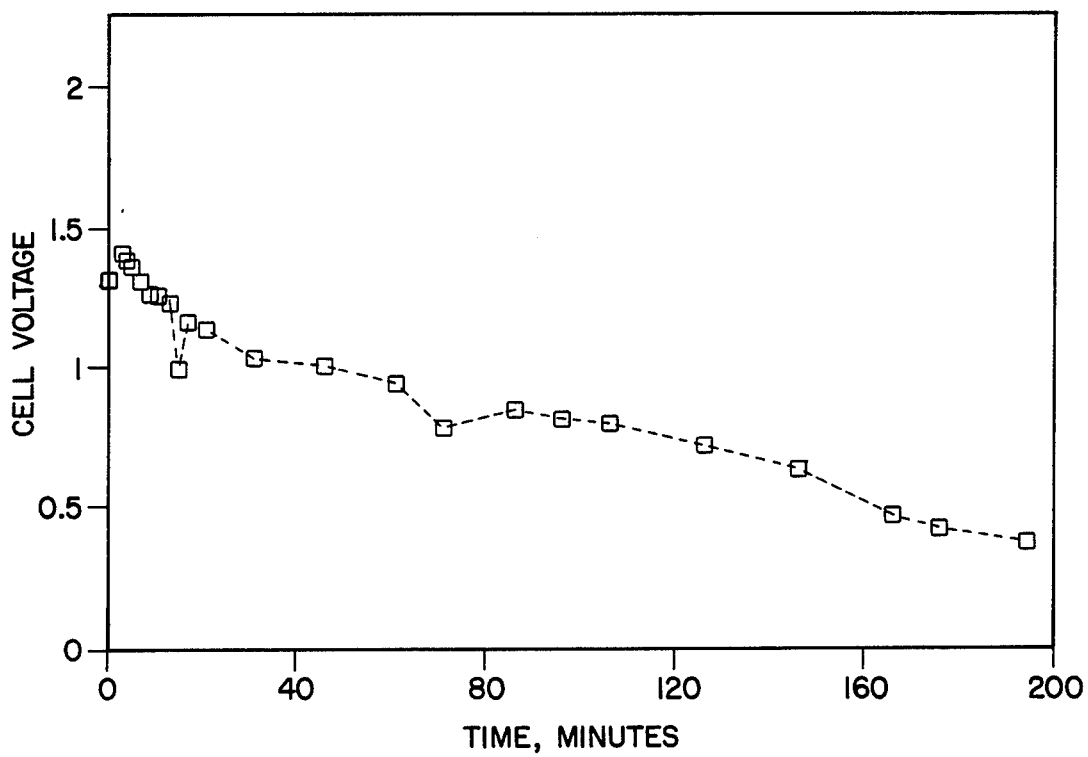
FIG. 5 is a graph illustrating the voltage output of a test cell operating at a current density of $1.0$ $mAcm^{-2}$.
Figure 6:
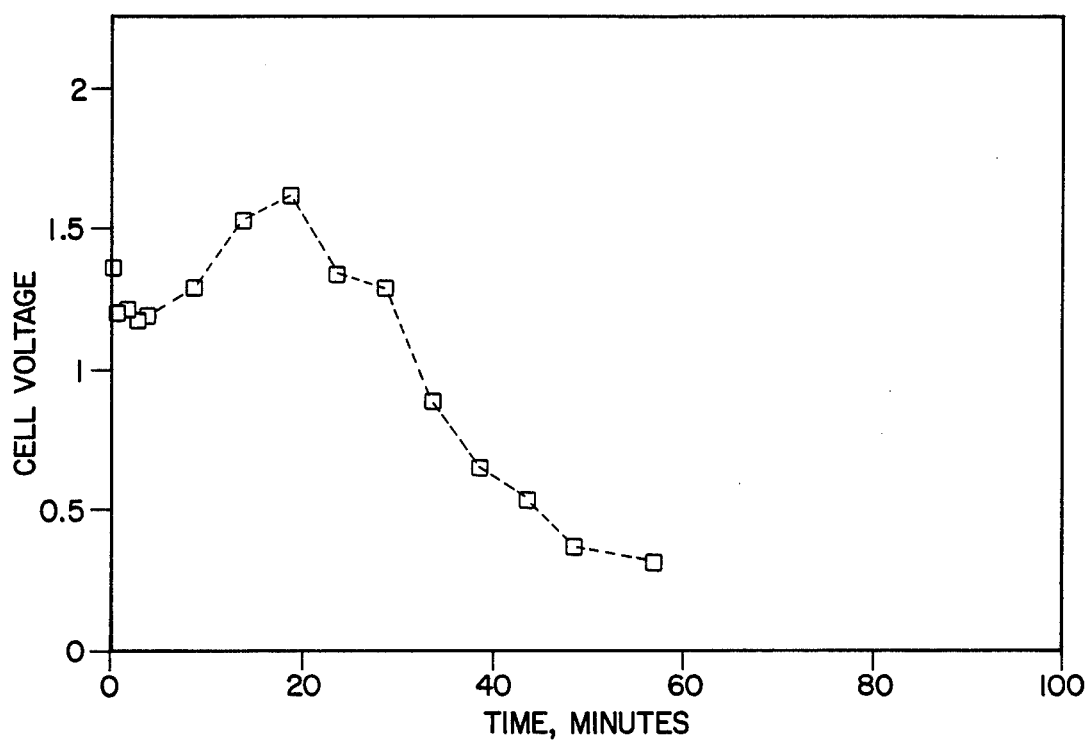
FIG. 6 is a graph illustrating the voltage output of a test cell operating at a current density of $5.0$ $mAcm^{31\ 2}$.

Voltages are measured using various current densities. The results are shown in FIGS. 4, 5 and 6 which have respective current densities of 0.5, 1.0 and 5.0 $mAcm^{-2}$. This cell yields voltages of greater than 2 V at a current density of 0.5 $mAcm^{-2}$ (FIG. 4).

The electrolyte of this system supercools to temperatures below −40° C. Further, the electrolyte remains liquid even when stored for days at −20° C. or for months at room temperature. This provides an extended life capability for the battery.

Several other test cells utilizing a calcium or lithium anode and various silver compound cathodes result in 0.5 to 10.0 $mAcm^{-2}$ current densities at initial voltages of 0.8 to over 3.5 volts. Depending upon the current densities, small sealed cells can operate from 20 minutes to over a day. One open circuit test has provided voltage for several weeks.

This invention has been described in detail with particular reference to certain preferred embodiments thereof, but it will be understood that variations and modifications can be effected within the spirit and scope of the invention.

What is claimed is:

1. A thermal battery, operational at ambient temperatures after initial activation comprising:
   an anode;
   a first relatively high melting temperature electrolyte in contact with said anode;
   a cathode;
   a second relatively high melting temperature electrolyte in contact with said cathode;
   a means for separating said first and said second electrolyte; and
   a means for mixing said first and said second electrolytes to form a low melting temperature electrolyte.

2. The thermal battery of claim 1 wherein said means for separating comprises a partition positioned between said first and said second electrolytes.

3. The thermal battery of claim 1 wherein said means for separating comprises encapsulating said first and said second electrolytes.

4. The thermal battery of claim 1 wherein said means for separating comprises coating said first and said second electrolytes.

5. An activated thermal battery, operating at ambient temperatures, comprising:
   an anode;
   a cathode; and
   a low melting temperature electrolyte in contact with said anode and said cathode.

6. The thermal battery of claim 1 wherein said first and said second electrolytes have melting temperatures in the range of about 60°-120° C.

7. A thermal battery of claim 1 wherein said first electrolyte is selected from the group consisting of: amides, inorganic nitrate salts and mixtures thereof.

8. The thermal battery of claim 1 wherein said second electrolyte is selected from the group consisting of: amides, inorganic nitrate salts and mixtures thereof.

9. The thermal battery of claim 5 wherein said low melting temperature electrolyte is formed by mixing two high melting temperature electrolytes selected from the group consisting of: amides, inorganic nitrate salts and mixtures thereof.

10. The thermal battery of claim 1 wherein said anode comprises a material selected from the group consisting of: aluminum amalgam, zinc amalgam, zinc, calcium, magnesium, lithium, lithium-aluminum alloys and lithium-silicon alloys.

11. The thermal battery of claim 5 wherein said anode comprises a material selected from the group consisting of: aluminum amalgam, zinc amalgam, zinc, calcium, magnesium, lithium, lithium-aluminum alloys and lithium-silicon alloys.

12. The thermal battery of claim 1 wherein said cathode comprises a material selected from the group consisting of: $CuCl_2$, $CuS$, $CuCrO_4$, $Ag_2S$, $Ag_2CrO_4$, $AgCl$, $AgF$, $AgBr$, $AgI$, $FeS_2$, $TiS_2$, $Ag_2MoO_4$, $Ag_2WO_4$, $Ag_2O$, $AgIO_3$, $AgIO_4$ and $(NH_4)_2Ce(NO_3)_6$.

13. The thermal battery of claim 5 wherein said cathode comprises a material selected from the group consisting of: $CuCl_2$, $CuS$, $CuCrO_4$, $Ag_2S$, $Ag_2CrO_4$, $AgCl$, $AgF$, $AgBr$, $AgI$, $FeS_2$, $TiS_2$, $Ag_2MoO_4$, $Ag_2WO_4$, $Ag_2O$, $AgIO_3$, $AgIO_4$ and $(NH_4)_2Ce(NO_3)_6$.

14. The thermal battery of claim 7 wherein said amides are selected from the group consisting of: acetamide, urea, N,N'-dimethyl urea, butyramide, N-methylacetamide and diacetamide.

15. The thermal battery of claim 8 wherein said amides are selected from the group consisting of: acetamide, urea, N,N'-dimethyl urea, butyramide, N-methylacetamide and diacetamide.

16. The thermal battery of claim 9 wherein said amides are selected from the group consisting of: acetamide, urea, N,N'-dimethyl urea, butyramide, N-methylacetamide and diacetamide.

17. The thermal battery of claim 7 wherein said inorganic nitrate salts are selected from the group consisting of lithium nitrate, sodium nitrate and ammonium nitrate.

18. The thermal battery of claim 8 wherein said inorganic nitrate salts are selected from the group consisting of lithium nitrate, sodium nitrate and ammonium nitrate.

19. The thermal battery of claim 9 wherein said inorganic nitrate salts are selected from the group consisting of lithium nitrate, sodium nitrate and ammonium nitrate.

* * * * *